(12) United States Patent
Ganiger et al.

(10) Patent No.: US 11,261,787 B2
(45) Date of Patent: Mar. 1, 2022

(54) AIRCRAFT ANTI-ICING SYSTEM

(71) Applicant: GENERAL ELECTRIC COMPANY, Schenectady, NY (US)

(72) Inventors: Ravindra Shankar Ganiger, Bangalore (IN); Viswanadha Gupta Sakala, Bangalore (IN); Nicholas Joseph Kray, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 157 days.

(21) Appl. No.: 16/015,468

(22) Filed: Jun. 22, 2018

(65) Prior Publication Data
US 2019/0390600 A1    Dec. 26, 2019

(51) Int. Cl.
| F02C 7/00 | (2006.01) |
| F02C 7/047 | (2006.01) |
| H05B 6/10 | (2006.01) |
| H01F 7/20 | (2006.01) |

(52) U.S. Cl.
CPC ............ F02C 7/047 (2013.01); H01F 7/20 (2013.01); H05B 6/10 (2013.01); F05D 2220/323 (2013.01)

(58) Field of Classification Search
None
See application file for complete search history.

(56) References Cited

U.S. PATENT DOCUMENTS

| 2,701,092 | A | * | 2/1955 | Henshaw | F02C 7/047 |
| | | | | | 219/635 |
| 2,853,638 | A | * | 9/1958 | Bonnano | F01D 15/10 |
| | | | | | 310/154.02 |
| 5,746,580 | A | | 5/1998 | Parker et al. | |
| 5,925,275 | A | | 7/1999 | Lawson et al. | |
| 6,102,333 | A | | 8/2000 | Gerardi et al. | |
| 6,237,861 | B1 | | 5/2001 | Northrop et al. | |
| 8,366,047 | B2 | | 2/2013 | Euvino, Jr. et al. | |
| 8,662,452 | B2 | | 3/2014 | Hallander et al. | |
| 8,915,058 | B2 | | 12/2014 | Knott et al. | |
| 8,931,740 | B2 | | 1/2015 | Nordin et al. | |
| 2004/0065092 | A1 | * | 4/2004 | Wadia | F01D 25/02 |
| | | | | | 60/778 |
| 2006/0032983 | A1 | | 2/2006 | Brand et al. | |
| 2008/0120980 | A1 | * | 5/2008 | Gemin | F01D 15/10 |
| | | | | | 60/802 |

(Continued)

FOREIGN PATENT DOCUMENTS

| KR | 1020180020387 A | 2/2018 |
| WO | 2011094347 A2 | 8/2011 |

OTHER PUBLICATIONS

Production Technoloy, Power Losses in Cables, 2017 (Year: 2017).*

(Continued)

*Primary Examiner* — Edwin Kang
(74) *Attorney, Agent, or Firm* — Venable LLP; Elizabeth C. G. Gitlin; Michele V. Frank

(57) ABSTRACT

An aircraft can include a turbine engine including a rotor and a stator, and also including a compressor, a combustor, and a turbine in axial flow arrangement. The aircraft can further include an anti-icing system with a magnetic field generator having a rotating portion and a non-rotating portion, as well as an array of carbon nanotubes thermally coupled to an exposed surface.

17 Claims, 6 Drawing Sheets

(56) References Cited

U.S. PATENT DOCUMENTS

| | | | |
|---|---|---|---|
| 2009/0115295 A1* | 5/2009 | Colin | F01D 15/10 310/67 R |
| 2010/0126178 A1* | 5/2010 | Hyde | F01D 15/10 60/767 |
| 2010/0206990 A1 | 8/2010 | Petrenko | |
| 2010/0327588 A1* | 12/2010 | Macchia | F01D 15/10 290/52 |
| 2011/0167781 A1 | 7/2011 | Maheshwari | |
| 2013/0039759 A1 | 2/2013 | Perkinson | |
| 2013/0043342 A1* | 2/2013 | Nordin | B64C 3/20 244/1 A |
| 2014/0000754 A1 | 1/2014 | Wallen | |
| 2014/0070054 A1* | 3/2014 | Burton | H01L 51/0048 244/134 D |
| 2014/0096503 A1 | 4/2014 | Ribarov et al. | |
| 2015/0377129 A1 | 12/2015 | Ward et al. | |
| 2016/0273456 A1* | 9/2016 | Zhang | F02C 7/36 |
| 2017/0114664 A1* | 4/2017 | Gemin | F01D 15/10 |
| 2017/0271711 A1 | 9/2017 | Benthien et al. | |
| 2018/0002041 A1 | 1/2018 | Khayms et al. | |
| 2018/0076404 A1 | 3/2018 | Cho et al. | |

OTHER PUBLICATIONS

Engineering ToolBox, Heat, Work and Energy, 2016 (Year: 2016).*

Northerwestern, Why does electrical current make heat?, 2012 (Year: 2012).*

Nature Communications, Recent progress and perspectives of space electric propulsion systems based on smart nanomaterials, 19 pgs, published Feb. 28, 2018.

I.F. Akyildiz et al, "Nanonetworks: A new communication paradigm", Computer Networks, vol. 52. Issue 12, Aug. 22, 2008, 4 pgs, https://www.sciencedirect.com/science/article/pii/S1389128608001151, accessed Jun. 22, 2018.

"Researchers Make Magnetic Graphene", Trynano.org, http://www.trynano.org/news/researchers-make-magnetic-graphene, accessed Jun. 19, 2018, 1 pg.

"Smart carbon nanotubes for wind turbine blade anti-icing system", CompositesWorld, https://www.compositesworld.com/news/smart-carbon-nanotubes-for-wind-turbine-blade-anti-icing-system, News Post Dec. 8, 2014, accessed Jun. 22, 2018, 3 pgs.

* cited by examiner

AIRCRAFT ANTI-ICING SYSTEM

BACKGROUND

The formation of ice on aircraft structures, such as engine inlets, wings, control surfaces, propellers, booster inlet vanes, inlet frames, etc., can a problem for contemporary aircraft. Ice adds weight, increases drag, and impairs the aerodynamic contour of airfoils, control surfaces and inlets, all of which reduce performance and increase fuel consumption. In addition, ice that forms on aircraft structures can become dislodged, increasing risk to other aircraft parts and engine components. Contemporary aircraft can include de-icing or anti-icing detection systems that utilize heat sources or heat generating elements to provide heat to the aircraft structure to melt or prevent the formation of ice.

BRIEF DESCRIPTION

In one aspect, the disclosure relates to an aircraft including a turbine engine including a rotor and a stator, and also including a compressor, a combustor, and a turbine in axial flow arrangement. The aircraft also includes an anti-icing system including a magnetic field generator comprising a rotating portion, a non-rotating portion, and an array of carbon structures, as well as an array of carbon nanotubes thermally coupled to an exposed surface and electrically coupled to the magnetic field generator.

In another aspect, the disclosure relates to a heating system including a magnetic field generator comprising a rotating portion, a non-rotating portion, and an array of carbon structures, as well as an array of carbon nanotubes thermally coupled to an exposed surface and electrically coupled to the magnetic field generator.

In another aspect, the disclosure relates to a method of heating an exposed surface having an array of carbon nanotubes thermally coupled to the exposed surface. The method includes generating a varying magnetic field encompassing an array of carbon structures, and flowing electric current through the array of carbon structures to the array of carbon nanotubes to heat the array of carbon nanotubes.

DETAILED DESCRIPTION

Figure 1:
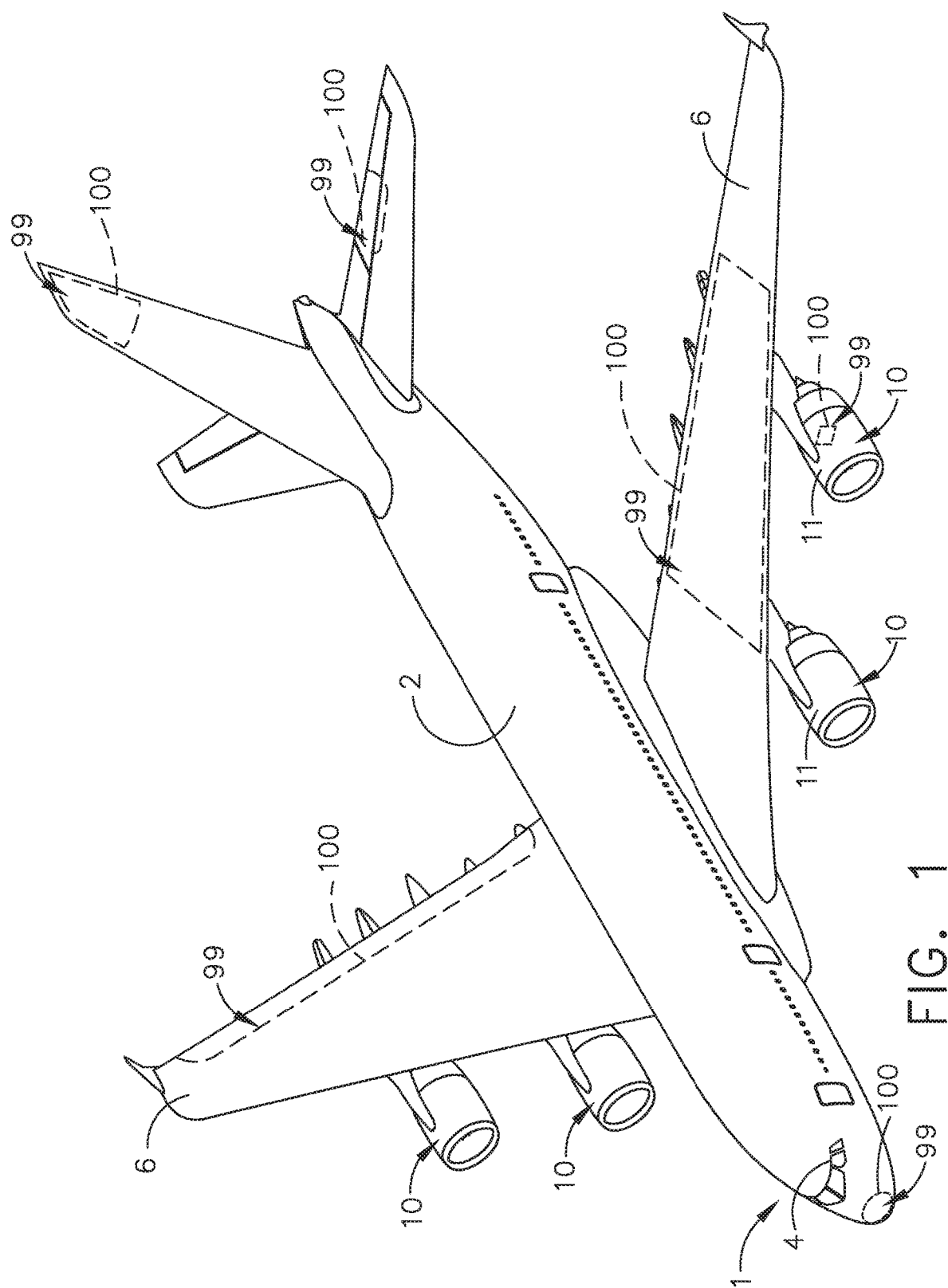
FIG. 1 is a perspective view of an aircraft having an anti-icing system in accordance with various aspects described herein.

The described embodiments of the present disclosure are directed to a heating system in the form of an anti-icing system for a turbine engine. The anti-icing system can include carbon nanotubes, which are a cylindrically-structured arrangement of carbon atoms that can be formed in a variety of ways including single-wall, double-wall, or multiple-wall forms. Such carbon nanotubes can have very high tensile strengths (in one example, up to 60 GPa), high thermal conductivities in a direction along the tube (in one example, up to 3500 W/m.K), and electrical conductivities similar to metals or semiconductors, depending on the specific arrangement of carbon atoms in the nanotube. When supplied with an electric current, carbon nanotubes can dissipate heat to surrounding structures.

For purposes of illustration, the present disclosure will be described with respect to an aircraft having a turbine engine. Furthermore, aspects of the present disclosure can be applicable to aircraft during flight or non-flight operations. It will be understood, however, that the disclosure is not so limited and may have general applicability in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates an aircraft 1 that includes a fuselage 2, a cockpit 4 positioned in the fuselage 2, and wing assemblies 6 extending outward from the fuselage 2. The aircraft 1 can also include multiple engines, including turbine engines 10 having nacelles 11, which by way of non-limiting example, can be turbojet engines, turbofan engines, or turboprop engines. While a commercial aircraft 1 has been illustrated, it is contemplated that aspects of the disclosure described herein can be used in any type of aircraft. Further, while two turbine engines 10 have been illustrated on each of the wing assemblies 6, it will be understood that any number of turbine engines 10 including a single turbine engine 10 on the wing assemblies 6, or even a single turbine engine 10 mounted in the fuselage 2 can be included.

The aircraft 1 can include a heating system 99 for generating heat. Such heat generation can be utilized for a variety of purposes, including cabin warming or engine clearance control in non-limiting examples. The exemplary heating system 99 is illustrated as an anti-icing system 100 being positioned at various locations around the aircraft 1. Non-limiting examples of locations for heating system 99 (e.g. the anti-icing system 100) include a turbine engine 10, the fuselage 2, or wing assemblies 6. While aspects of the present disclosure will be discussed in terms of the anti-icing system 100, it will be understood that the disclosure is not so limited and that such aspects can also apply to, or be included in, the heating system 99. In addition, as used herein, "anti-icing" will refer to removing ice that has accumulated on an aircraft component, or to the prevention of ice accumulation when environmental conditions are favorable for ice formation.

Figure 2:
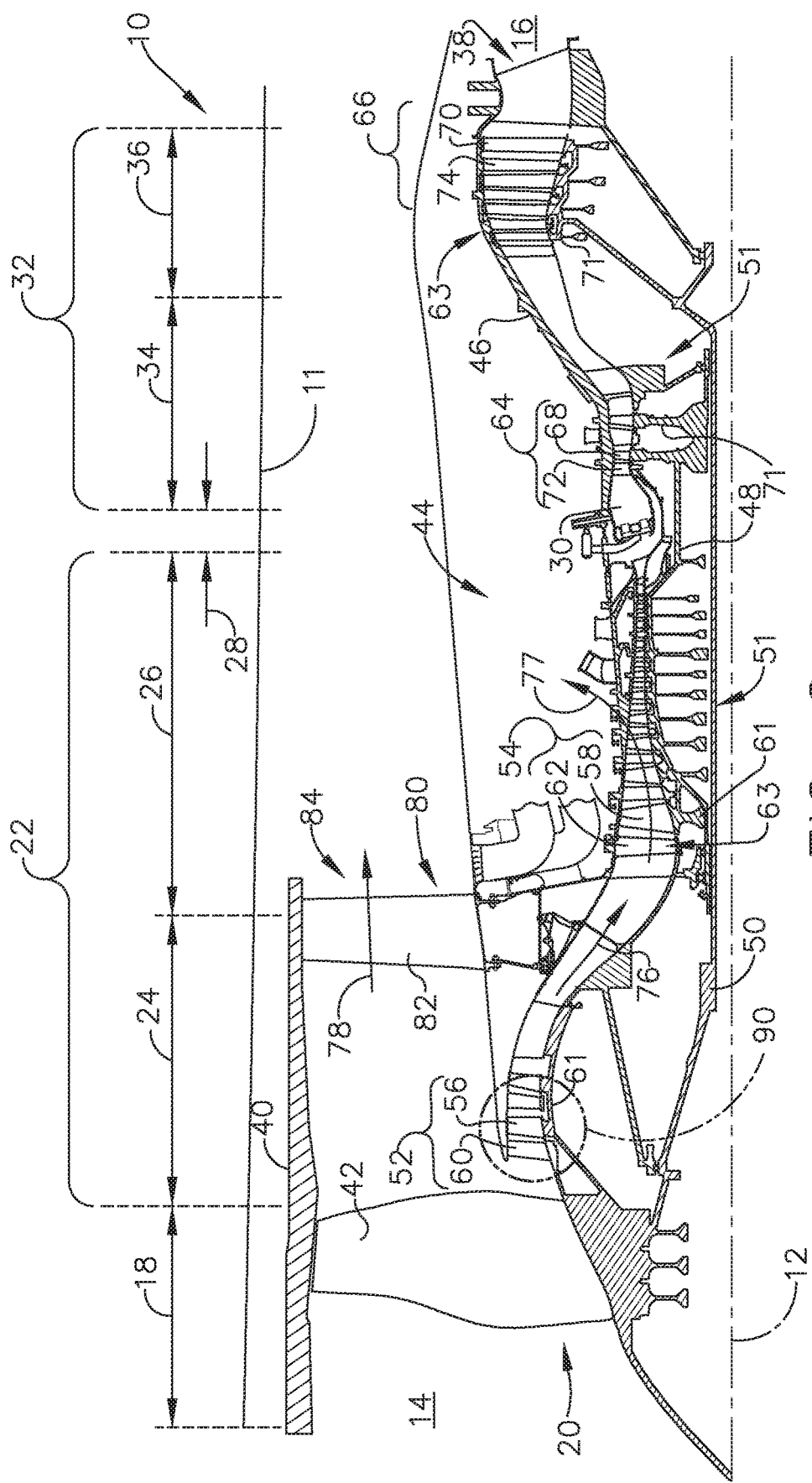
FIG. 2 is a cross-sectional diagram of a turbine engine for the aircraft of FIG. 1 with the anti-icing system.

FIG. 2 is a schematic cross-sectional diagram of an exemplary gas turbine engine 10 which can be utilized in the aircraft 1. The engine 10 is housed within the nacelle 11 and has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Figure 3:
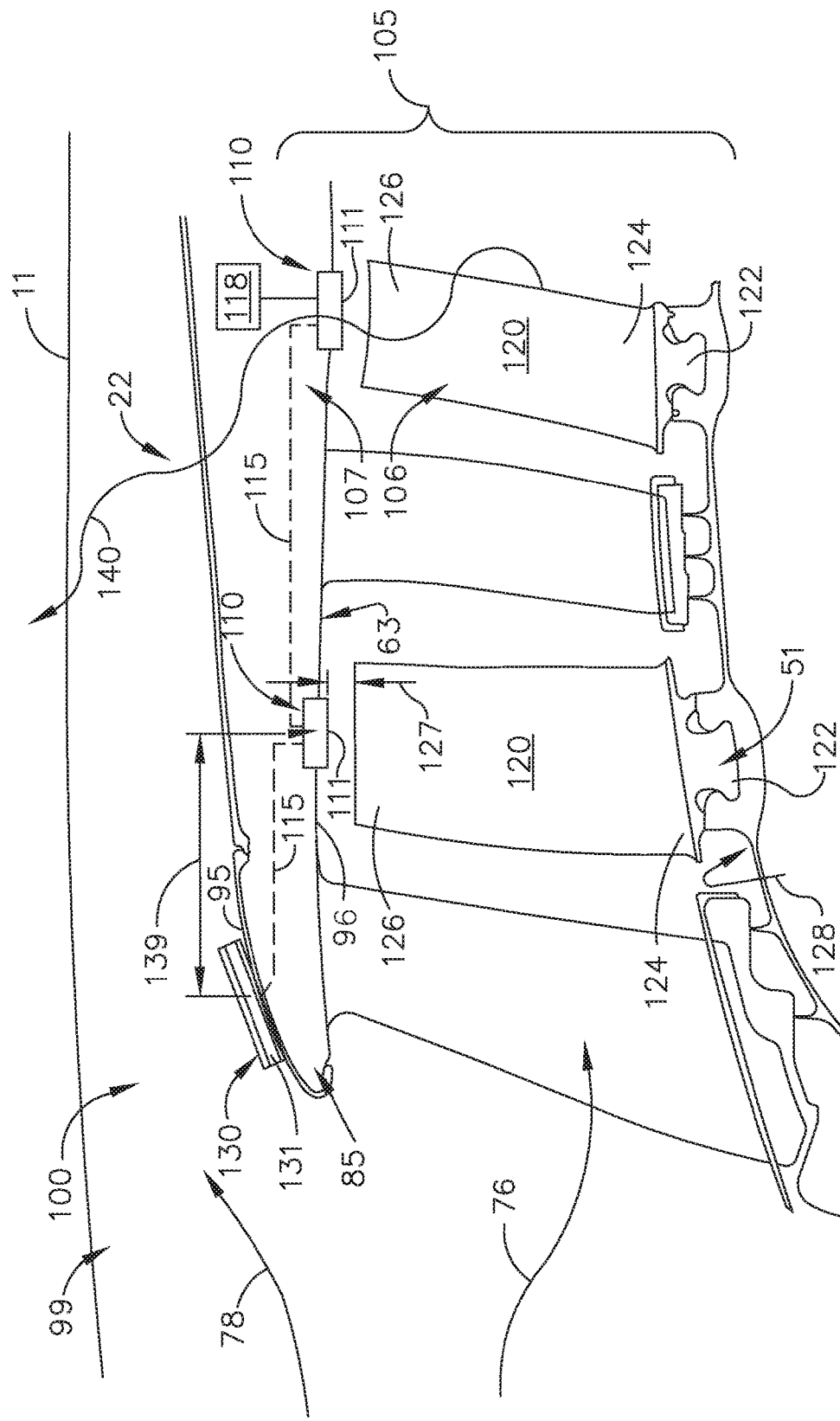
FIG. 3 is a cross-sectional view of a portion of the anti-icing system of FIG. 1 including an anti-icing structure and a power supply structure according to various aspects described herein.

A portion 90 of the compressor section 22 is illustrated in FIG. 3, where the exemplary anti-icing system 100 (FIG. 1) is shown in further detail with an exposed surface of the aircraft 1. As used herein, an "exposed" surface will refer to a surface exposed, directly or indirectly, to accreted ice, or exposed to external airflows or water flows such that ice can accrete on the surface. One exemplary exposed surface 95 that can be susceptible to ice formation is illustrated on a splitter nose 85. The splitter nose 85 forms the leading edge to the inlet of the LP compressor 24 and splits the entering air into the bypass airflow 78, which flows over the engine core, and the pressurized airflow 76, which flows through the engine core. It is contemplated that the splitter nose 85 can be formed of a composite material, including carbon-filled epoxy. Alternately the splitter nose 85 can be metallic.

The anti-icing system 100 can include a magnetic field generator 105 with a rotating portion 106, such as the rotor 51, and a non-rotating portion 107, such as the stator 63. The magnetic field generator 105 can also include a power supply structure 110 having an array 111 of carbon structures. The array 111 of carbon structures can be coupled to the stator 63 and confront the rotor 51. In addition, the array 111 of carbon structures can be thermally coupled to a second exposed aircraft surface 96 (e.g. of the stator 63). While the power supply structure 110 is illustrated as being partially embedded within the stator 63, it will be understood that the relative size and position of the power supply structure 110 can vary. For example, the power supply structure 110 can be positioned on the stator 63, or on another exposed aircraft surface, without being embedded within the surface.

The rotating portion 106 of the magnetic field generator 105 can also include a rotatable component such as an exemplary rotating airfoil 120 extending from a platform 122 between a root 124 and a tip 126 can be included in the magnetic field generator 105. The root 124 is coupled to the platform 122, and the array 111 of carbon structures can confront the tip 126 of the exemplary rotating airfoil 120. It will be understood that the exemplary airfoil 120 can be a rotating blade in the fan section 18, compressors 24, 26, or turbines 64, 66 (FIG. 2).

An exemplary rotation direction 128 of the rotor 51 is also shown; it can be appreciated that the exemplary airfoil 120 rotates with the rotor 51. A minimum spacing distance 127 can be defined between the tip 126 and the array 111 of carbon structures at the closest approach of the tip 126 during rotation of the airfoil 120. It is contemplated that the minimum spacing distance 127 can be 30 cm or less, or between 5 cm and 50 cm, in non-limiting examples.

It is further contemplated that the magnetic field generator 105 can include multiple arrays 111 of carbon structures. The example of FIG. 3 shows multiple power supply structures 110 (each having an array 111 of carbon structures) coupled to the stator 63 and confronting a rotating airfoil 120. In addition, the multiple arrays 111 of carbon structures can be electrically or thermally coupled to one another via conductors 115. Such a conductor 115 can include carbon nanotubes, such as carbon nanotube strands or fibers, or can also include wiring, such as aluminum or copper wiring.

It will be understood that the magnetic field generator 105 can have a variety of forms. One exemplary magnetic field generator can include a generator accessory module in a gear box (not shown) within the turbine engine 10, wherein the generator accessory module can generate magnetic fields and electromagnetic waves. Another exemplary magnetic field generator can include a ferrous component (not shown) coupled to the rotor 51, wherein motion of the ferrous component can generate a magnetic field. In still another example, the magnetic field generator can include an insulated graphene sheet proximate a moving component on the rotor 51, wherein compression air waves generated by the moving rotor component encounter the insulated graphene sheet and activate a magnetic field.

The anti-icing system 100 can further include at least one anti-icing structure 130 coupled to an exposed aircraft surface such as the splitter nose 85. The anti-icing structure 130 and the power supply structure 110 of the magnetic field generator 105 can be electrically or thermally coupled by the conductor 115. It is further contemplated that a conductor 115 having carbon nanotubes can electrically couple the array 111 of carbon structures to the exposed aircraft surface. In addition, the anti-icing structure 130 is schematically illustrated as being coupled to an exposed surface 95 of an aircraft component such as the splitter nose 85. While illustrated as being positioned on the exposed surface 95, it is contemplated that the anti-icing structure 130 can be at least partially embedded within the surface of the splitter nose 85 to optimize airflow streamlines over the splitter nose surface and the anti-icing structure 130. The anti-icing structure can also include an array 131 of carbon nanotubes. In this manner, the array of carbon nanotubes can be thermally coupled to an exposed aircraft surface (e.g. the splitter nose 85) and electrically coupled to the magnetic field generator 105.

In addition, at least one charge storage device 118 can be included in the anti-icing system 100. The charge storage device 118 can be positioned at any desired location within the aircraft 1, and is illustrated in an exemplary position adjacent one of the power supply structures 110. The charge storage device 118 can be electrically coupled to the array 111 of carbon structures in the magnetic field generator 105, or to the array 131 of carbon nanotubes in the anti-icing structure 130. In addition, the charge storage device 118 can include any suitable device for the environment, such as a Li-ion battery pack in a non-limiting example.

Further, the power supply structure 110 can be separated from the anti-icing structure 130. As shown, the power supply structure 110 is positioned on the rotor 51 and the anti-icing structure 130 is positioned on the splitter nose 85. A coupling distance 139 can be defined between an array 111 of carbon structures in the magnetic field generator 105 and the array 131 of carbon nanotubes within the anti-icing structure 130. In non-limiting examples the coupling distance 139 can be less than 2 m, or between 30-400 cm, or greater than 4 m. The conductor 115 can electrically or thermally couple the array 111 of carbon structures and the array 131 of carbon nanotubes across the coupling distance 139.

Figure 4:
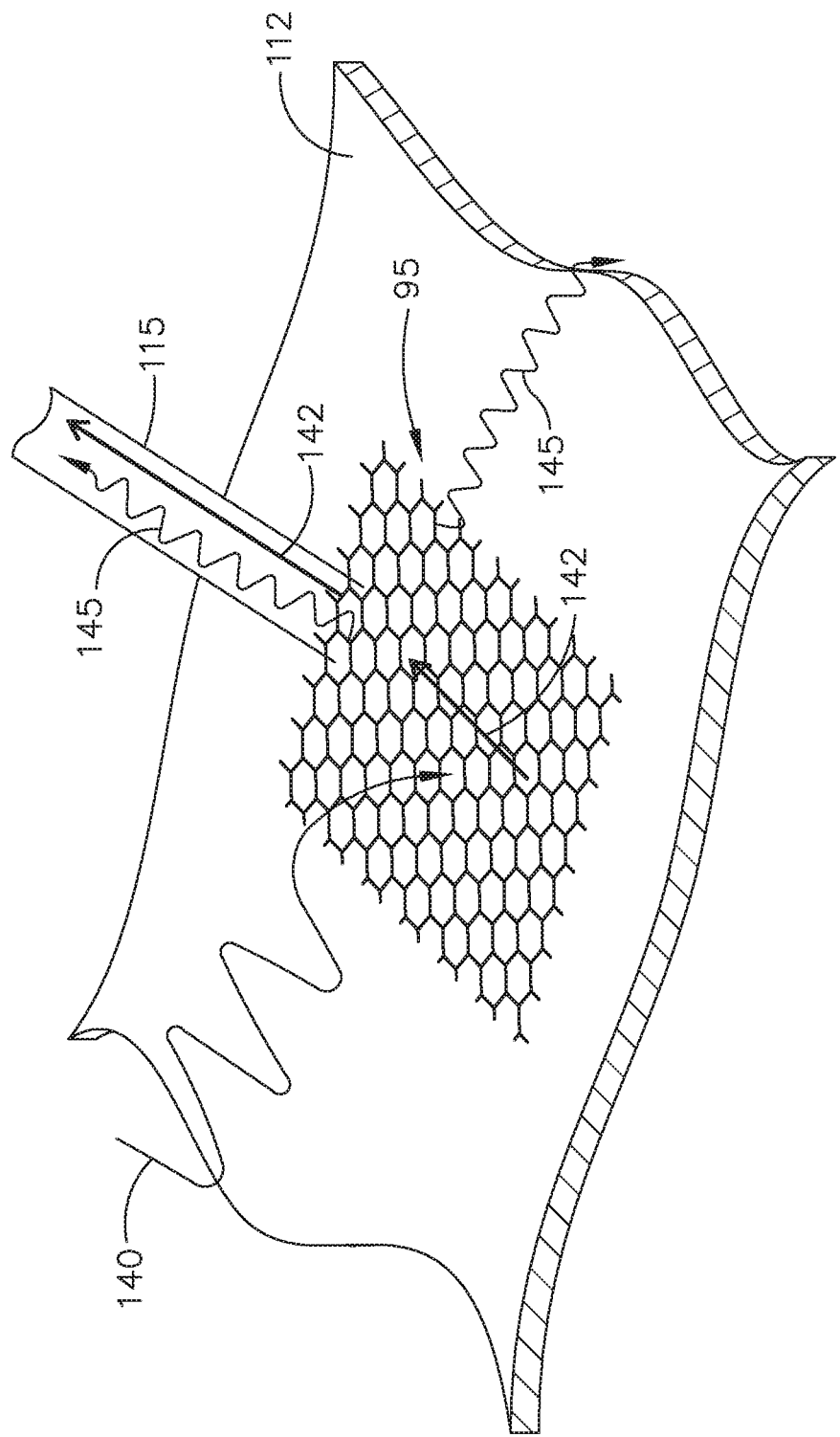
FIG. 4 is a schematic view of an exemplary array of carbon structures which can be utilized in the anti-icing system of FIG. 1.

The magnetic field generator 105 can generate a varying magnetic field 140, including by rotating the rotor 51. The varying magnetic field 140 can be capable of passing through at least a portion of the nacelle 11 encompassing the rotor 51, and can also encompass either of the arrays 111, 131. Referring now to FIG. 4, an exemplary array 101 of carbon structures is shown under the effect of the varying magnetic field 140. It will be understood that the exemplary array 101 can be utilized for the array 111 of carbon structures within the power supply structure 110, or for the array 131 of carbon nanotubes within the anti-icing structure 130.

The exemplary array 101 is illustrated as a sheet of graphene, which is a one-atom-thick hexagonal lattice of carbon atoms. It is further contemplated that other carbon structures such as nanotubes, nanobuds, nanoribbons, buckyballs, and the like, or combinations thereof, can be utilized in the exemplary array 101. Optionally, the array 101 of carbon structures can be disposed on or within a carrier surface or layer 112 made of a conductive material.

The varying magnetic field 140 can induce an electric current 142 in the exemplary array 101 of carbon structures. The induced current 142 can be directed through a conductive material, such as the conductor 115, to other components such as the charge storage device 118, the power supply structure 110, or the anti-icing structure 130. In addition, the induced current 142 can cause heating of the exemplary array 101, which is illustrated with arrows 145. The heat can be dissipated to an adjacent exposed surface or directed to other components, including by way of the conductor 115. It can be appreciated that in this manner, electric current, electric power, or heat can be supplied between the array 111 of carbon structures in the power supply structure 110 and the array 121 of carbon nanotubes in the anti-icing structure 130.

It can be appreciated that the magnetic field 140 can vary in both magnitude and direction. For example, adjusting a rotational speed of the rotor 51 can cause a varying magnitude of the magnetic field 140, wherein a rate of change of rotational speed is proportional to the induced current 142 due to the varying magnetic field 140. It is further contemplated that an adjustment to a rotational speed of the rotor 51 can also be based on a predetermined level of heat generation for the exposed surface 95, 96 (FIG. 3) of the aircraft 1.

Figure 5:
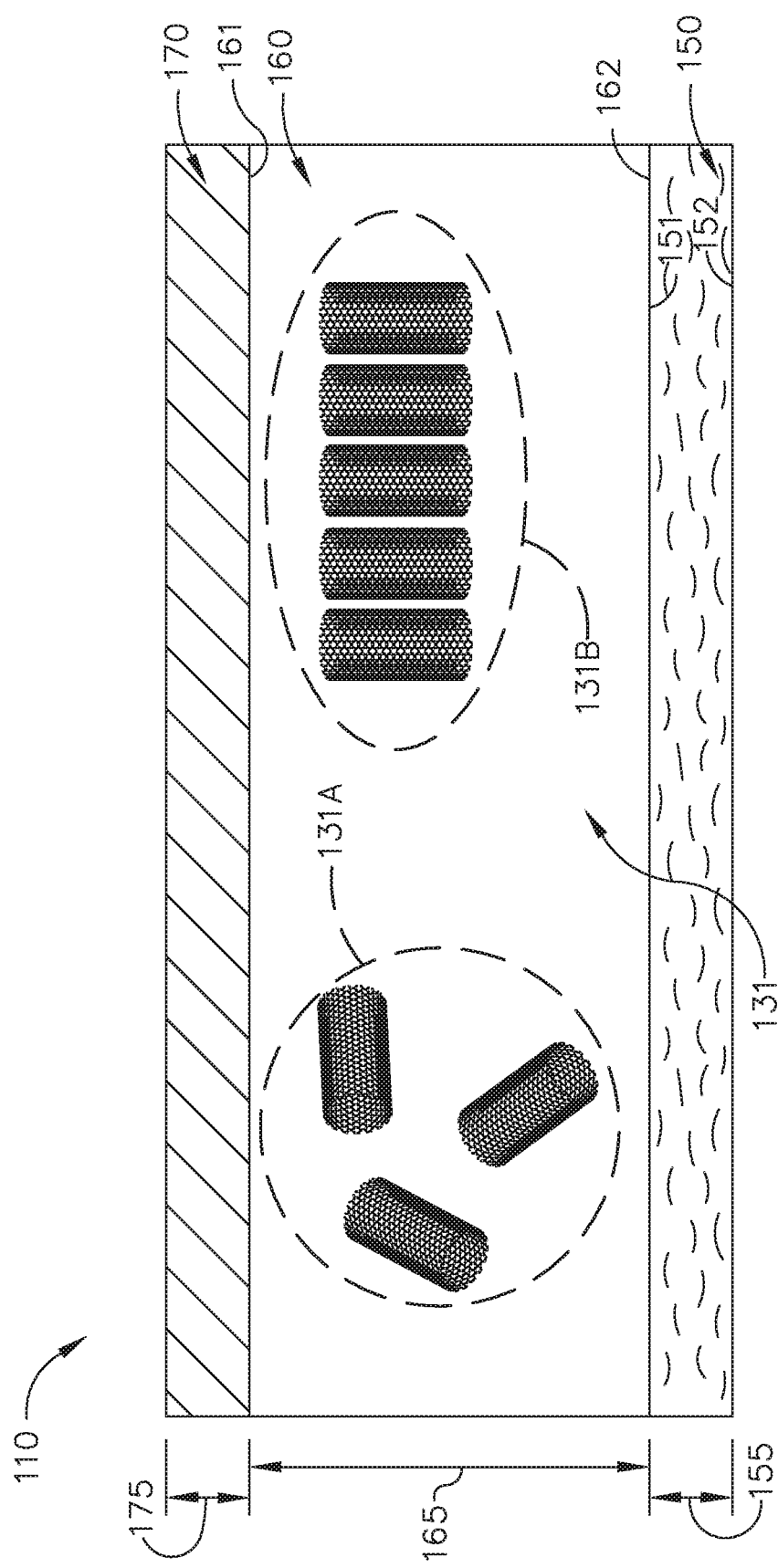
FIG. 5 is a schematic, cross-sectional view of the anti-icing structure of FIG. 3.
Figure 6:
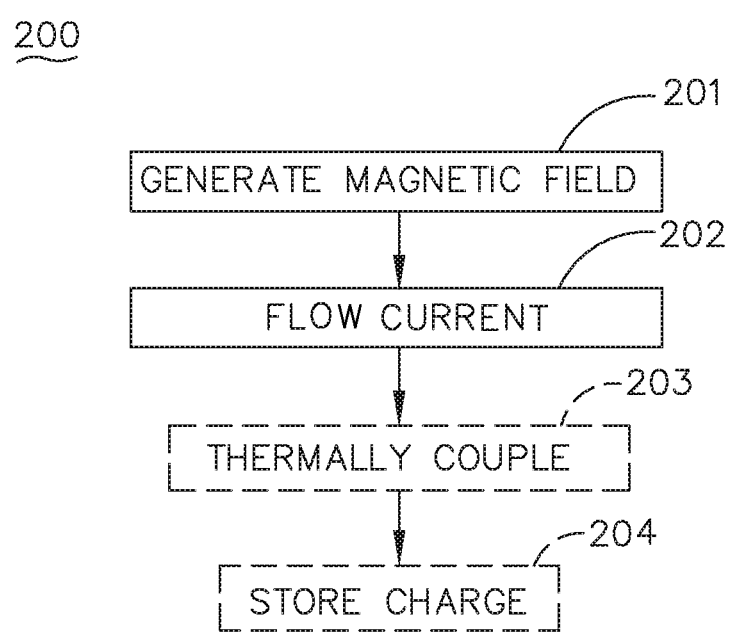
FIG. 6 is a flowchart illustrating a method of preventing ice formation on the aircraft of FIG. 1.

Turning to FIG. 5, the anti-icing structure 130 is illustrated in further detail. It is contemplated that the anti-icing structure 130 can include an insulation layer 150, a heat-generating layer 160, and an erosion protection layer 170.

The insulation layer 150 can have a first side 151 and opposing second side 152, the second side 152 being coupled to the exposed surface 95 (FIG. 3). An insulation layer thickness 155 can be defined between the first and second sides 151, 152 as shown. In a non-limiting example, the insulation layer thickness can be between 200 and 1400 μm. Further, the insulation layer can be made from a variety of electrically or thermally insulating materials such as fiberglass, polymer/plastics, or composite materials, in non-limiting examples.

The heat-generating layer 160 can include a first side 161 and opposing second side 162, where the second side 162 of the heat-generating layer 160 can be coupled to the first side 151 of the insulation layer 150 as shown. A heating layer thickness 165 can be defined between the first and second sides 161, 162 as shown, such as between 200 and 1400 μm in a non-limiting example.

It is contemplated that the array 131 of carbon nanotubes can be disposed within the heat-generating layer 160 and thermally coupled to the splitter nose 85. Carbon nanotubes 168 within the array 131 can have a variety of orientations. For example, a first portion 131A of the array 131 can have carbon nanotubes 168 oriented randomly, and a second portion 131B of the array 131 can have carbon nanotubes oriented in alignment with one another.

The erosion protection layer 170 can be coupled to the heat-generating layer 160 within the anti-icing structure 130. The erosion protection layer 170 can be metallic and have a protection layer thickness 175 between 200 and 1400 μm in a non-limiting example. It is further contemplated that the protection layer thickness 175 can be the same size as the insulation layer thickness 155. In another example, the heating layer thickness 165 can be twice as large as one of the insulation layer thickness 155 or the protection layer thickness 175.

During operation of the turbine engine 10 (FIG. 2), rotation of the airfoil 120 (FIG. 3) along with the rotor 51 can generate a varying magnetic field 140 (FIG. 4) encompassing the array 111 of carbon structures (FIG. 3) or the array 131 of carbon nanotubes. In the illustrated example of FIG. 3, the varying magnetic field 140 induces an electric current within the array 111 of carbon structures in the power supply structure 110. The electric current can be directed to the anti-icing structure 130 via the conductor 115, causing heat to be generated within the array 131 of carbon nanotubes. It is also contemplated that the varying magnetic field 140 can induce currents 142 in multiple arrays 111, such as for supplying charge to the charge storage device 118 or for powering multiple anti-icing structures 130 around the aircraft 1.

The generated heat can be utilized for anti-icing of the splitter nose 85, or for any aircraft component coupled to the anti-icing structure 130. Furthermore, the induced electric current within the array 111 of carbon structures can also cause heating within the array 111. Such generated heat can be utilized for anti-icing of components proximate the power supply structure 110, such as for the stator 63, or any components within 2 m of the power supply structure 110, in non-limiting examples. It is further contemplated that heat generated within the array 111 of carbon structures can be thermally directed to other aircraft components, such as the splitter nose 85, wing assemblies 6, or fuselage 2 (FIG. 1).

A method 200 of heating an exposed surface having an array of carbon structures (e.g. the exemplary array 101 of carbon structures, the array 111 of carbon structures, or the array 131 of carbon nanotubes) thermally coupled to the exposed surface includes, at 201, generating a varying magnetic field encompassing the array of carbon structures. The varying magnetic field can effect a flow of electric current at 202 through the array of carbon structures to the array of carbon nanotubes to heat the array of carbon nanotubes. Optionally, generating the varying magnetic field can include rotating the rotor within the engine of the aircraft. The magnetic field can be varied in magnitude, such as by varying a rotational speed of the rotor. Optionally, at 203 the method can include thermally coupling an array of carbon nanotubes (e.g. the array 131) to an array of carbon structures (e.g. the array 111). Optionally, at 204 the method can include storing a generated electric charge from the flow of electric current through the array of carbon structures as described above.

Aspects of the present disclosure provide for a variety of benefits. Traditional anti-icing solutions have included using heated bleed air from the engine to remove or prevent ice accumulation from aircraft components such as booster and engine inlet structures, which limits engine performance. In addition, complex air ducting structures have been utilized to direct such heated bleed air to aircraft components for anti-icing, which also adds weight to the engine. The use of carbon nanotubes in the heat-generating layer can reduce engine weight and complexity, as dedicated ducting systems are no longer needed. In one example a weight reduction of more than 50 pounds was achieved through use of the anti-icing system of the present disclosure. The heat-generating carbon nanotubes can also improve engine performance, as more air can remain within the engine for combustion instead of being pulled out as bleed air.

Further, the use of induced currents in an array of carbon structures can supply power or heat for other components of the aircraft, including other components of the anti-icing system of the present disclosure. Carbon structures such as graphene can be heated more efficiently, and undergo a faster rate of temperature increase, compared to traditional heated structures such as resistive wiring. Such properties of carbon structures can provide for improved performance of the anti-icing system, including rate of removal of accreted ice or prevention of ice accumulation on an exposed surface. Heat generated by the heating system or anti-icing system of the present disclosure can also be utilized in a variety of contexts, including cabin heating or other aircraft heating needs, or in non-aircraft settings such as vehicles, roads, or other structures with heating needs.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of heating an exposed surface of an engine having an engine core and a central axis defining at least a radial direction and an axial direction, the method comprising:
   positioning an anti-icing structure on the exposed surface and protruding radially outward therefrom, the anti-icing structure having an array of carbon nanotubes thermally conductively coupled to the exposed surface;
   generating, by rotating a rotor within the engine, a varying magnetic field encompassing an array of carbon structures, thereby inducing a current within the array of carbon structures that generates heat;
   varying a magnitude of the varying magnetic field by varying a rotational speed of the rotor;
   transferring the heat, via a thermal conductor, from the array of carbon structures to the array of carbon nanotubes; and
   transferring the heat from the array of carbon nanotubes to the exposed surface, wherein the exposed surface is located on a splitter nose within the engine, the splitter nose splitting a bypass airflow, which flows over the engine core and a pressurized air flow, which flows through the engine core,
   wherein the anti-icing structure is axially offset from a leading edge of the splitter nose.

2. The method of claim 1, wherein the varying magnetic field passes through at least a portion of a nacelle encompassing the rotor.

3. The method of claim 1, further comprising adjusting the rotational speed of the rotor based on a predetermined level of heat generation for the exposed surface.

4. The method of claim 1, further comprising storing a generated electric charge from the varying magnetic field.

5. The method of claim 1, further comprising transferring the heat from the array of carbon structures to a stator thermally conductively coupled to the array of carbon structures.

6. The method of claim 1, wherein the array of carbon structures comprises a graphene sheet.

7. The method of claim 1, wherein the array of carbon structures is spaced from the array of carbon nanotubes by a coupling distance between 0 m and 4 m.

8. A method of heating an exposed surface of a turbine engine having a central axis defining at least a radial direction and an axial direction, an engine core, a rotor, and a stator, the method comprising:
   positioning an anti-icing structure on the exposed surface and protruding radially outward therefrom, the anti-icing structuring having an array of carbon nanotubes thermally conductively coupled to the exposed surface;
   generating heat within an array of carbon structures located on the stator and confronting the rotor by varying a magnetic field encompassing the array of carbon structures;
   transferring, via a thermal conductor, the heat generated from the array of carbon structures to the array of carbon nanotubes thermally conductively coupled to the exposed surface; and
   transferring the heat generated from the array of carbon nanotubes to the exposed surface, wherein the exposed surface is located on a splitter nose within the turbine engine, the splitter nose splitting a bypass airflow, which flows over the engine core and a pressurized air flow, which flows through the engine core,
   wherein the anti-icing structure is axially offset from a leading edge of the splitter nose.

9. The method of claim 8, wherein the array of carbon structures comprises a graphene sheet.

10. The method of claim 8, wherein varying the magnetic field comprises rotating the rotor within the turbine engine.

11. The method of claim 10, wherein varying the magnetic field comprises varying a rotational speed of the rotor, thereby varying a magnitude of the magnetic field.

12. The method of claim 10, further comprising adjusting a rotational speed of the rotor based on a predetermined level of heat generation for the exposed surface.

13. The method of claim 8, further comprising transferring a portion of the heat generated from the array of carbon structures to the stator thermally conductively coupled to the array of carbon structures.

14. The method of claim 8 wherein the transferring further comprises transferring the heat generated over a distance between 30 cm and 400 cm from the array of carbon structures to the array of carbon nanotubes.

15. The method of claim 8, further comprising storing a generated electric charge from the array of carbon structures within at least one power storage device.

16. The method of claim 8, wherein the thermal conductor comprises at least one of carbon nanotubes, aluminum, or copper.

17. The method of claim 8, further comprising arranging the array of carbon nanotubes within a layered anti-icing structure having an insulation layer and an erosion protection layer.

* * * * *